US012203468B2

(12) United States Patent
Peng et al.

(10) Patent No.: US 12,203,468 B2
(45) Date of Patent: Jan. 21, 2025

(54) DEVICE AND METHOD FOR MONITORING OIL PRESSURE IN OIL CYLINDER OF DIAPHRAGM COMPRESSOR

(71) Applicant: Xi'an Jiao Tong University, Shaanxi (CN)

(72) Inventors: Xueyuan Peng, Shaanxi (CN); Xueying Li, Shaanxi (CN); Jiahao Chen, Shaanxi (CN); Xiaohan Jia, Shaanxi (CN)

(73) Assignee: Xi'an Jiao Tong University, Shaanxi (CN)

( * ) Notice: Subject to any disclaimer, the term of this patent is extended or adjusted under 35 U.S.C. 154(b) by 933 days.

(21) Appl. No.: 17/280,923

(22) PCT Filed: Feb. 21, 2019

(86) PCT No.: PCT/CN2019/075694
§ 371 (c)(1),
(2) Date: Mar. 29, 2021

(87) PCT Pub. No.: WO2020/168512
PCT Pub. Date: Aug. 27, 2020

(65) Prior Publication Data
US 2021/0340974 A1    Nov. 4, 2021

(51) Int. Cl.
*F04B 45/053*    (2006.01)
*F04B 49/06*    (2006.01)
(Continued)

(52) U.S. Cl.
CPC ........ *F04B 49/065* (2013.01); *F04B 45/0533* (2013.01); *F04B 49/103* (2013.01);
(Continued)

(58) Field of Classification Search
CPC .. F04B 49/065; F04B 45/0533; F04B 49/103; G01L 9/045
See application file for complete search history.

(56) References Cited

FOREIGN PATENT DOCUMENTS

| CN | 1056933 | 12/1991 |
|---|---|---|
| CN | 201203494 | 3/2009 |

(Continued)

OTHER PUBLICATIONS

"International Search Report (Form PCT/ISA/210) of PCT/CN2019/075694", mailed on Nov. 19, 2019, with English translation thereof, pp. 1-5.

*Primary Examiner* — Jamel E Williams
(74) *Attorney, Agent, or Firm* — JCIP GLOBAL INC.

(57) ABSTRACT

The present disclosure provides a device for monitoring oil pressure in an oil cylinder of a diaphragm compressor, including a piston rod and a strain gauge circuit. The strain gauge circuit includes a strain gauge component and a bridge circuit connected, and the strain gauge component is arranged on the surface of the piston rod. A strain gauge component is noninvasively arranged on the piston rod of the diaphragm compressor to measure the load of the piston rod, such that the oil pressure can be measured indirectly, and thus the oil pressure of the diaphragm compressor can be measured nondestructively. Nondestructive and noninvasive monitoring of the diaphragm compressor is safe and reliable, and can achieve accurate monitoring of the oil pressure especially in high-pressure working conditions.

19 Claims, 10 Drawing Sheets

(51) Int. Cl.
 *F04B 49/10* (2006.01)
 *G01L 9/04* (2006.01)
(52) U.S. Cl.
 CPC ...... *G01L 9/045* (2013.01); *F04B 2201/1201* (2013.01); *F04B 2201/1208* (2013.01); *F04B 2201/1212* (2013.01); *F04B 2207/043* (2013.01)

(56) References Cited

FOREIGN PATENT DOCUMENTS

| | | | | |
|---|---|---|---|---|
| CN | 201433801 | | 3/2010 | |
| CN | 202836840 | | 3/2013 | |
| CN | 102749149 B | * | 1/2015 | |
| CN | 105628267 | | 6/2016 | |
| CN | 105865693 A | * | 8/2016 | ............... G01L 5/00 |
| CN | 106596144 | | 4/2017 | |
| CN | 106626238 | | 5/2017 | |
| CN | 106626238 A | * | 5/2017 | |
| CN | 107860507 A | * | 3/2018 | |
| CN | 110073190 A | * | 7/2019 | .......... F04B 45/0533 |
| CN | 110374857 A | * | 10/2019 | ............ F04B 45/053 |
| GB | 1435733 | | 5/1976 | |
| JP | H0517523 U | * | 2/1991 | |
| JP | 2004340299 A | * | 12/2004 | |
| JP | 2009106175 A | * | 5/2009 | |

\* cited by examiner

DEVICE AND METHOD FOR MONITORING OIL PRESSURE IN OIL CYLINDER OF DIAPHRAGM COMPRESSOR

CROSS-REFERENCE TO RELATED APPLICATION

This application is a 371 of international application of PCT application serial no. PCT/CN2019/075694, filed on Feb. 21, 2019. The entirety of the above-mentioned patent application is hereby incorporated by reference herein and made a part of this specification.

TECHNICAL FIELD

The present disclosure relates to the field of compressor technologies, and more particularly, to a device and a method for monitoring oil pressure in an oil cylinder of a diaphragm compressor.

BACKGROUND

The diaphragm compressor is a kind of special equipment for gas compression that only allows minor leakage or even does not allow any leakage. Because of its better sealing performance, wider pressure range, and larger compression ratio, the diaphragm compressor is widely used in the petrochemical industry such as hydrogen refueling stations to compress and transport various high-purity gases, precious rare gases, toxic and harmful gases and corrosive gases. In the diaphragm compressor, a piston pushes working oil in an oil cavity of a cylinder, and then pushes a diaphragm to reciprocate in a diaphragm cavity to change the working volume of an air cavity, and achieve a leak-free cyclical work process with the cooperation of a suction valve and a discharge valve. In a hydraulic oil circulation system of the diaphragm compressor, oil leaked from a hydraulic piston ring is compensated by a compensation loop, and the quantity of oil compensated is adjusted by mounting an oil overflow valve on an oil hydraulic cylinder head.

The oil pressure variation of the diaphragm compressor is a comprehensive reflection of the working performances and operating states of the compressor. An oil pressure variation curve in the working process of the diaphragm compressor can reflect the position of the piston, the period of a suction process, actions of opening and closing the suction valve, actions of opening and closing the discharge valve, the period of a discharge process, actions of the oil overflow valve, and an oil replenishment process. Therefore, the oil pressure variation curve is the most effective tool for diagnosing faults of the diaphragm compressor. It is an effective method for improving equipment operation reliability and safety by dynamically monitoring the oil pressure of the diaphragm compressor, and it is a strong demand of diaphragm compressor designers and users to possess the monitoring of equipment operation states.

The diaphragm compressor has a wide operating pressure range, and its discharge pressure can reach up to 300 MPa. However, if a pressure tap for monitoring pressure is machined on a cylinder of the diaphragm compressor, the integrity of the cylinder may be seriously damaged, and the strength of the cylinder may be affected. Furthermore, there exist serious security threats, and leakage may be caused.

SUMMARY

1. A Technical Problem to be Solved

A diaphragm compressor has a wide operating pressure range, and its discharge pressure can reach up to 300 MPa. However, if a pressure tap for monitoring pressure is machined on a cylinder body of the diaphragm compressor, leakage may be caused by the pressure tap trepanned on the cylinder body, and the strength of the cylinder may be impacted. The present disclosure provides a device and a method for monitoring oil pressure in an oil cylinder of a diaphragm compressor.

2. Technical Solutions

To achieve the above-mentioned objective, the present disclosure provides a device for monitoring oil pressure in the oil cylinder of a diaphragm compressor, which includes a piston rod and a strain gauge circuit. The strain gauge circuit includes a strain gauge component and a bridge circuit connected, and the strain gauge component is arranged on the surface of the piston rod.

Alternatively, the strain gauge component includes a first strain gauge, and the first strain gauge is connected to the bridge circuit.

Alternatively, the strain gauge component includes a second strain gauge and a third strain gauge. The second strain gauge is arranged along an axial direction of the piston rod, and the third strain gauge and the second strain gauge are perpendicular to each other. The second strain gauge is connected to a first bridge arm, and the third strain gauge is connected to a second bridge arm.

Alternatively, the strain gauge component includes a fourth strain gauge, a fifth strain gauge, a sixth strain gauge, and a seventh strain gauge. The fourth strain gauge is arranged along the axial direction of the piston rod, the fifth strain gauge and the fourth strain gauge are perpendicular to each other, the fourth strain gauge is connected to a full-bridge circuit, and the fifth strain gauge is connected to the full-bridge circuit. The sixth strain gauge is arranged along the axial direction of the piston rod, the seventh strain gauge and the sixth strain gauge are perpendicular to each other, the sixth strain gauge is connected to the full-bridge circuit, and the seventh strain gauge is connected to the full-bridge circuit.

Alternatively, the device for monitoring oil pressure in the oil cylinder of the diaphragm compressor further includes a photoelectric sensor unit and a signal collection unit, wherein the photoelectric sensor unit includes a flywheel, and the flywheel and a photoelectric sensor are arranged correspondingly. The signal collection unit is connected to the strain gauge component, and the signal collection unit is connected to the photoelectric sensor. The signal collection unit is connected to a data processing unit.

Alternatively, the data processing unit is an intelligent terminal.

Alternatively, the signal collection unit includes a collection card and a signal conditioning module.

The present disclosure also provides a method for monitoring oil pressure in an oil cylinder of a diaphragm compressor, and the method includes the following steps.

In Step 1, a signal collection unit synchronously collects a first voltage signal and a second voltage signal outputted by a strain gauge circuit, converts the collected first voltage signal into a first digital signal for storage, and converts the collected second voltage signal into a second digital signal for storage.

In Step 2, the starting and ending time of one complete cycle is determined according to the first digital signal.

In Step 3, the second digital signal is processed according to the starting and ending time of the complete cycle to obtain an oil pressure value.

Alternatively, processing the second digital signal in Step 3 includes:

(1) calculating strain of a piston rod:

$$\varepsilon(\theta) = \frac{4e(\theta)}{(1+v)EK_s},$$

wherein $\theta$ represents a crank angle, $\varepsilon(\theta)$ represents the strain, $e(\theta)$ represents the second digital signal, $v$ represents a Poisson's ratio, E represents an elastic modulus, and $K_s$ represents a sensitivity coefficient of a strain gauge;

(2) calculating the load of the piston rod: $F_p(\theta)=A_R\varepsilon(\theta)$, wherein $A_R$ represents a cross-sectional area of the piston rod, and $F(\theta)$ represents the load of the piston rod; and (3) calculating an oil pressure: $F_o(\theta)=F_p(\theta)-F_1(\theta)$, $p_o(\theta)=F_o(\theta)/A_P$, wherein $F_o(\theta)$ represents an oil side pressure, $F_1(\theta)$ represents a reciprocating inertial force, the reciprocating inertial force $F_1(\theta)=m_p r\omega^2$ (cos $\theta+\lambda$ cos $2\theta$), wherein $m_p$ represents a reciprocating inertial mass, r represents a crank radius, $\omega$ represents a rotation speed of the compressor, $\lambda$ represents a crank radius-connecting rod length ratio $\theta$ represents the crank angle and $p_o(\theta)$ represents an oil pressure, and $A_P$ represents a cross-sectional area of a piston.

Alternatively, in Step 1, the first voltage signal is subjected to filtering, amplification, conditioning and A/D conversion, then is converted into a first digital signal, and the first digital signal is transmitted to an intelligent terminal for processing. The second voltage signal is subjected to filtering, amplification, conditioning and analog/digital (A/D) conversion, then is converted into a second digital signal, and the second digital signal is transmitted to the intelligent terminal for processing.

3. Beneficial Effects

Compared with the existing technologies, the device and the method for monitoring oil pressure in the oil cylinder of the diaphragm compressor provided by the present disclosure have the following beneficial effects.

In the device for monitoring oil pressure in the oil cylinder of the diaphragm compressor provided by the present disclosure, the strain gauge component is arranged on the surface of the piston rod, and the strain gauge component is connected to the bridge circuit. In this way, the sensibility of the strain gauge component is improved, and input and output keep a linear relation. A strain gauge component is noninvasively arranged on the piston rod of the diaphragm compressor to measure the load of the piston rod, such that the oil pressure can be measured indirectly, and thus the oil pressure of the diaphragm compressor can be measured nondestructively. Nondestructive and noninvasive monitoring of the diaphragm compressor is safe and reliable and can achieve accurate monitoring of the oil pressure, especially in high-pressure working conditions.

Figure 1:
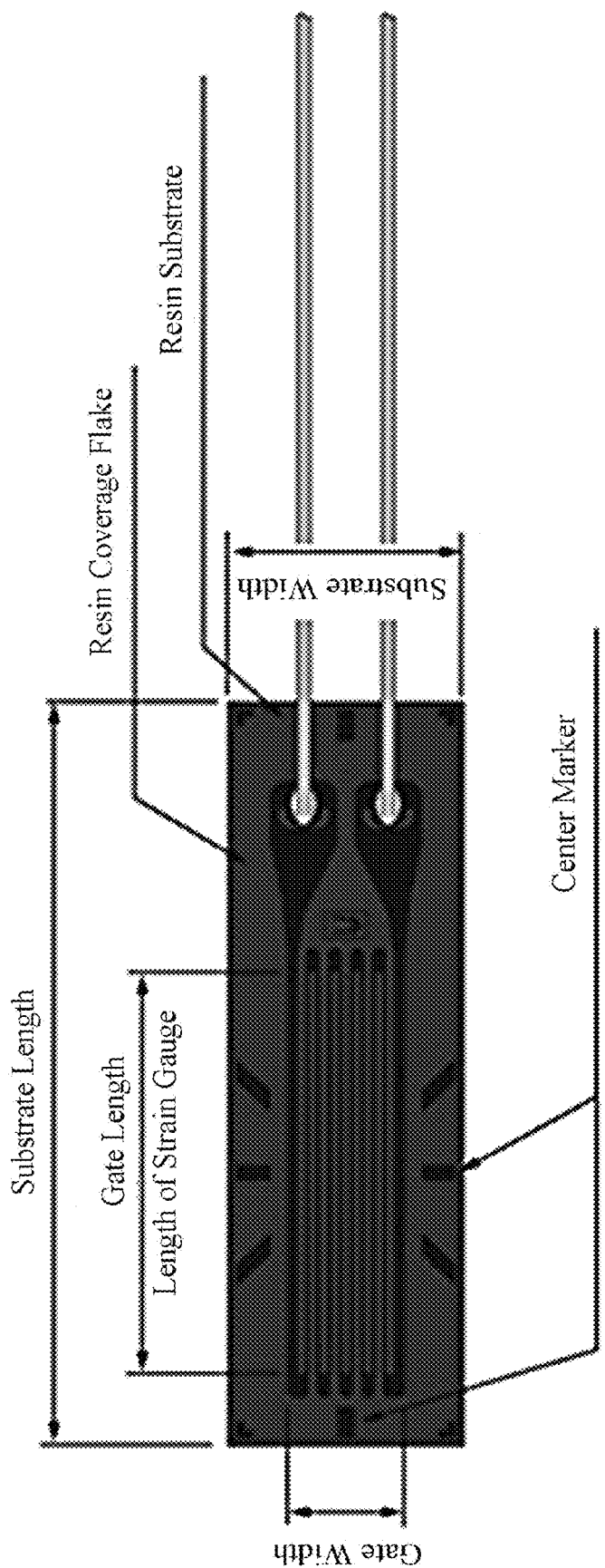
FIG. 1 is a first schematic structural diagram of a strain gauge according to the present disclosure.
Figure 2:
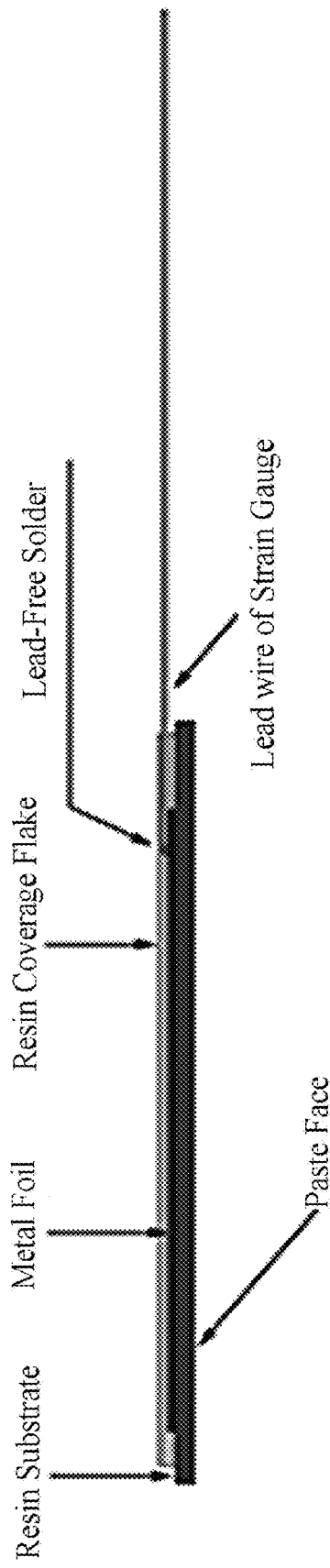
FIG. 2 is a second schematic structural diagram of a strain gauge according to the present disclosure.
Figure 3:
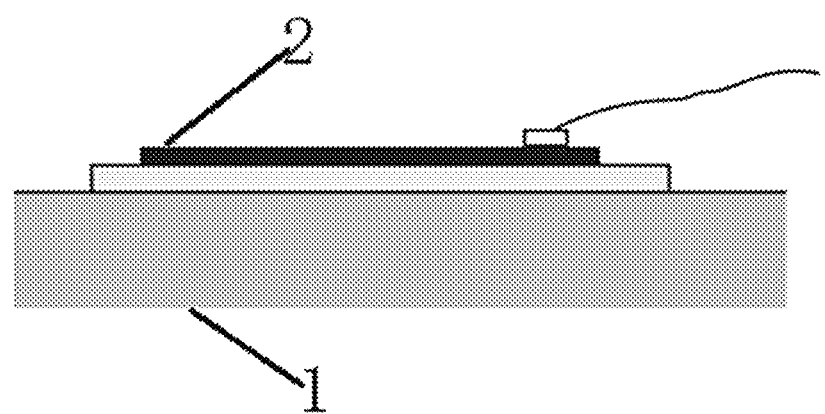
FIG. 3 is a first schematic structural diagram of a device for monitoring oil pressure in an oil cylinder of a diaphragm compressor according to the present disclosure.
Figure 4:
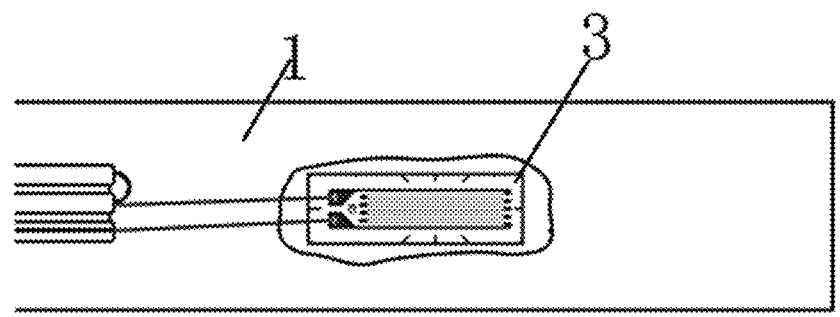
FIG. 4 is a second schematic structural diagram of the device for monitoring oil pressure in the oil cylinder of the diaphragm compressor according to the present disclosure.
Figure 5:
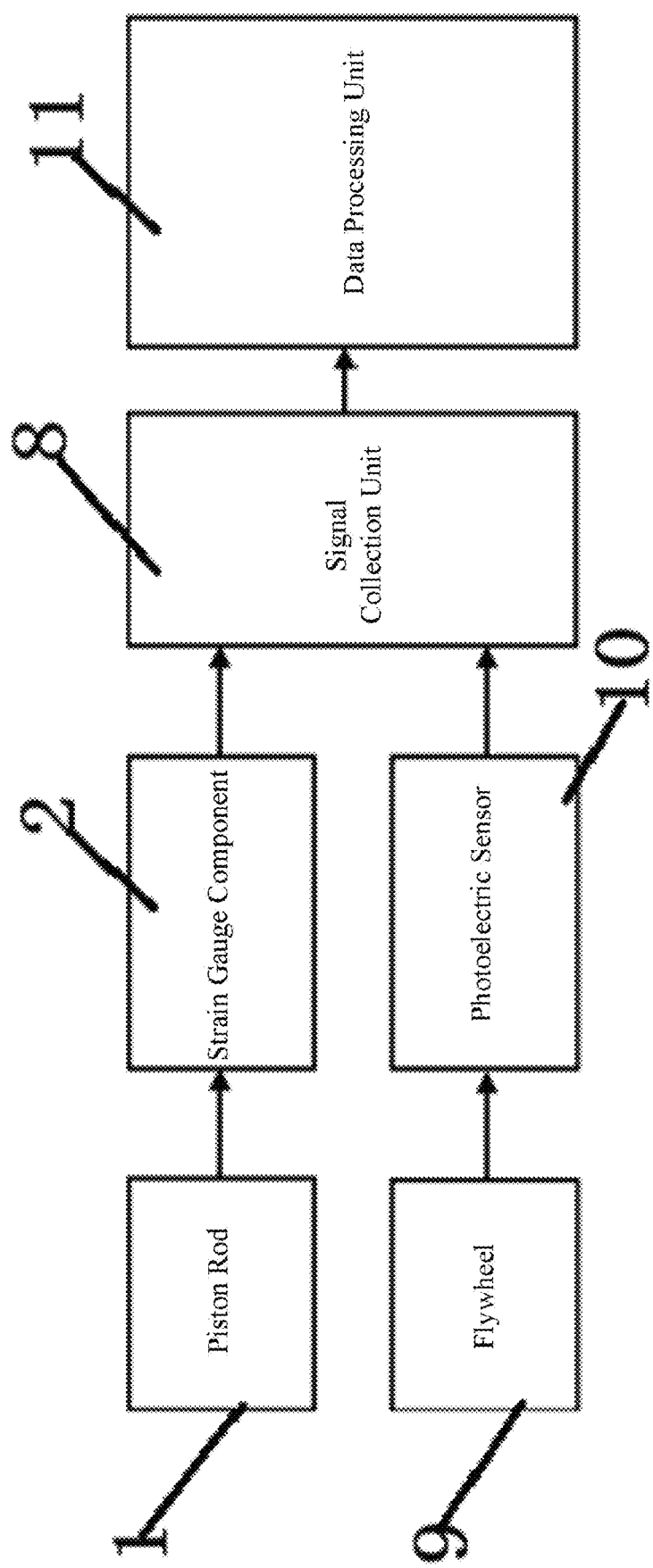
FIG. 5 is a schematic diagram of the device for monitoring oil pressure in the oil cylinder of the diaphragm compressor according to the present disclosure.
Figure 6:
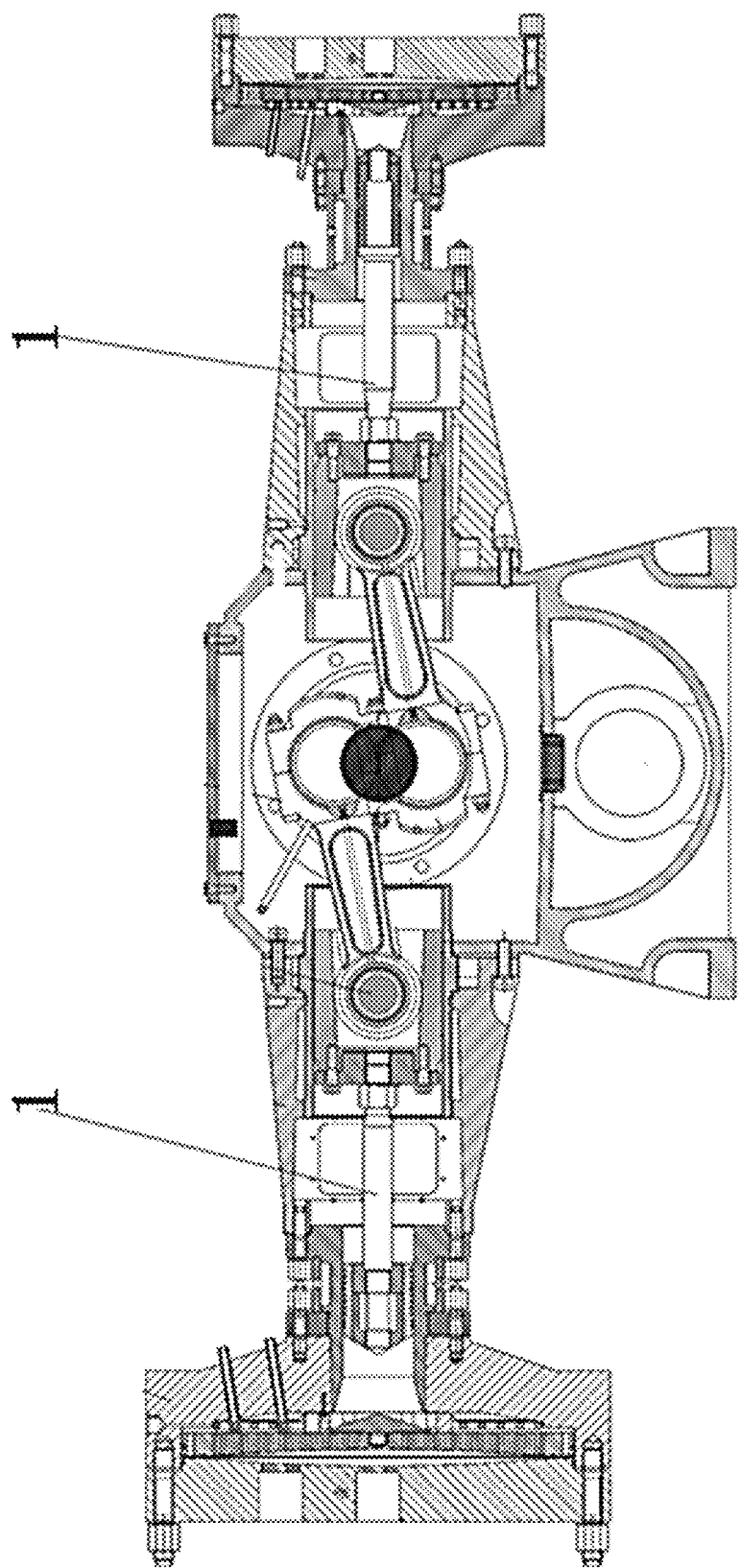
FIG. 6 is the first schematic structural diagram of the diaphragm compressor according to the present disclosure.
Figure 7:
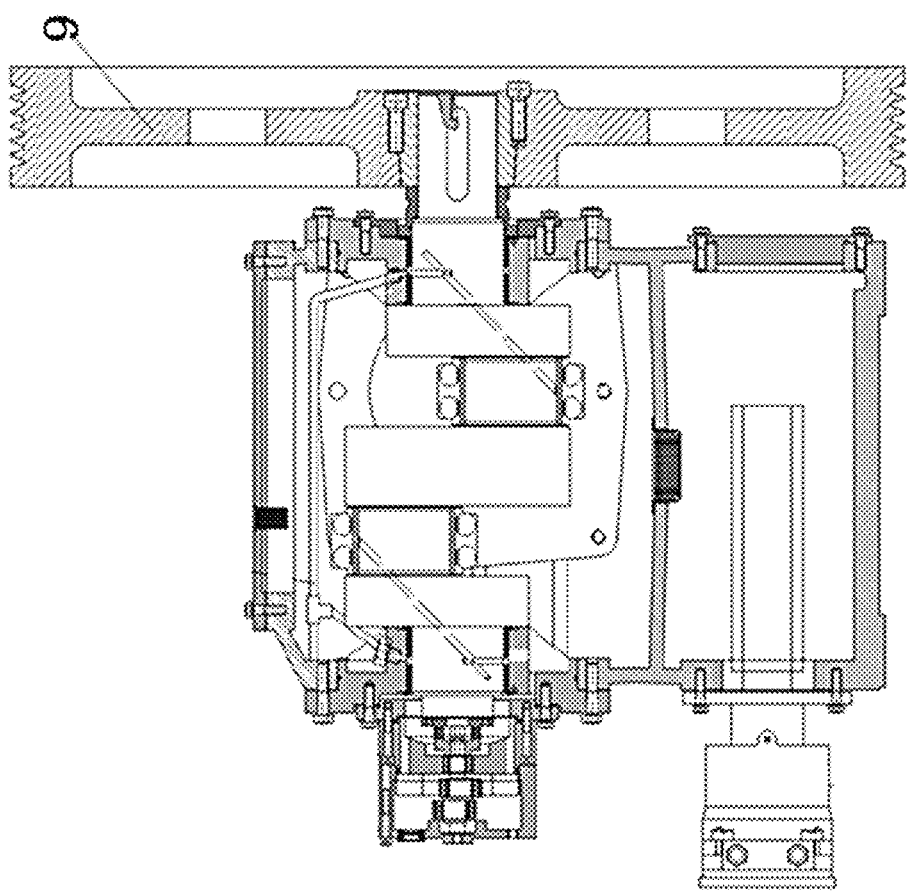
FIG. 7 is a second schematic structural diagram of the diaphragm compressor according to the present disclosure.

In the figures, 1—piston rod, 2—strain gauge component, 3—first strain gauge, 4—second strain gauge, 5—third strain gauge, 6—first bridge arm, 7—second bridge arm, 8—signal collection unit, 9—flywheel, 10—photoelectric sensor, 11—data processing unit.

DETAILED DESCRIPTION

Specific embodiments of the present disclosure will be described below in detail with reference to the accompanying drawings. According to these detailed descriptions, those skilled in the art can clearly understand the present disclosure and can implement the present disclosure. Without departing from the principle of the present disclosure, features in different embodiments may be combined to obtain new implementations, or some features in some embodiments may be replaced to obtain other preferred implementations.

A strain gauge is a component for strain measurement, which is composed of a sensitive grid or the like. The working principle of a resistance strain gauge is based on a strain effect. That is, when mechanical deformation occurs on a conductor or semiconductor material under the action of external forces, a resistance value thereof changes accordingly. This phenomenon is referred to as the "strain effect".

A quadrilateral measurement bridge circuit composed of a resistor, a capacitor, an inductor and so on is referred to as an electric bridge, wherein four sides of the electric bridge are bridge arms. As a measurement circuit, a DC power supply is connected to two ends of a diagonal of the quadrilateral to extract voltage across the other diagonal. Based on a balance equation of the electric bridge, parameters (such as resistance, resistance, capacitance, and inductance) of a component to be measured can be obtained according to values of known components in the bridge arms.

With reference to FIG. 1 to FIG. 11, the present disclosure provides a device for monitoring oil pressure in an oil cylinder of a diaphragm compressor, which includes a piston rod 1 and a strain gauge circuit. The strain gauge circuit includes a strain gauge component 2 and a bridge circuit connected, and the strain gauge component 2 is arranged on the surface of the piston rod 1.

The strain gauge component 2 is pasted onto the surface of the piston rod 1 by an adhesive. An element attached with the strain gauge component 2 is always in a certain temperature field. If a linear expansion coefficient of the sensitive grid of the strain gauge is not equal to that of construction material, the resistance of the sensitive grid may change when the temperature changes because extensions (or compressions) of the sensitive grid and the element are not equal and thus additional tension (or compression) is exerted on the sensitive grid, which leads to inaccurate measurement. This phenomenon is referred to as a temperature effect.

The strain gauge component 2 is a sensor whose resistance changes with stress. Almost all the strain gauge components 2 have lower sensitivity. By using a bridge circuit, the sensitivity of the strain gauge component 2 can be increased manyfold, and input and output keep a linear relation. The detection of the change of the strain gauge component using the bridge circuit also has the advantages of lower passing electric current and lower self-heating of the strain gauge. Therefore, the bridge circuit is frequently used in the application of the strain gauge sensor. The bridge circuit includes a one-quarter bridge connection mode, a half-bridge connection mode, and a full-bridge connection mode. A lead wire of the strain gauge is a 25 mm silver-coated copper wire (0.12 mm to 0.16 mm in diameter). The piston rods of different compressors have different diameters, and thus different models of strain gauges may be selected. That is, the strain gauges may be selected according to actual needs.

Further, the strain gauge component 2 includes a first strain gauge 3, and the first strain gauge 3 is connected to the bridge circuit.

The surface of piston rod 1 is provided with only one strain gauge, i.e., the first strain gauge 3. The first strain gauge 3 is also referred to as a working strain gauge and may be configured to measure the strain of the piston rod 1. The first strain gauge 3 is attached to piston rod 1. When the length of the piston rod 1 changes, the first strain gauge 3 will be compressed or stretched accordingly. Therefore, the resistance of the first strain gauge 3 will change, and the change of the resistance will cause the output voltage of the bridge circuit to change. Oil pressure is obtained after processing a voltage signal collected.

Further, the strain gauge component 2 includes a second strain gauge 4 and a third strain gauge 5, wherein the second strain gauge 4 is arranged along an axial direction of the piston rod 1, and the third strain gauge 5 and the second strain gauge 4 are perpendicular to each other. The second strain gauge 4 is connected to a first bridge arm 6, and the third strain gauge 5 is connected to a second bridge arm 7.

Figure 8:
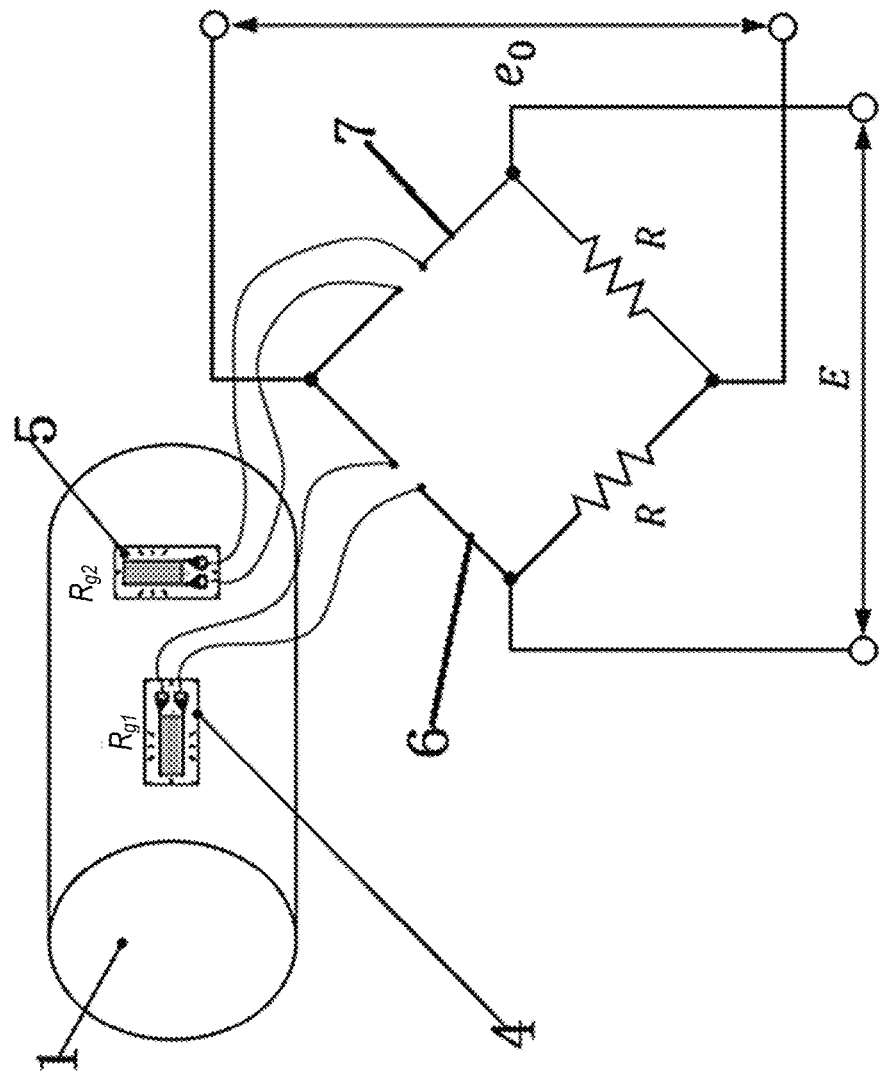
FIG. 8 is a schematic diagram of the connection of a half-bridge circuit in the device for monitoring oil pressure in the oil cylinder of the diaphragm compressor according to the present disclosure.
Figure 9:
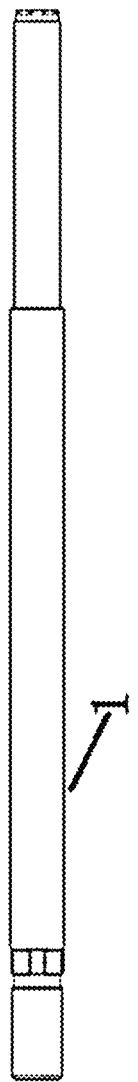
FIG. 9 is a schematic structural diagram of a piston rod according to the present disclosure.
Figure 10:
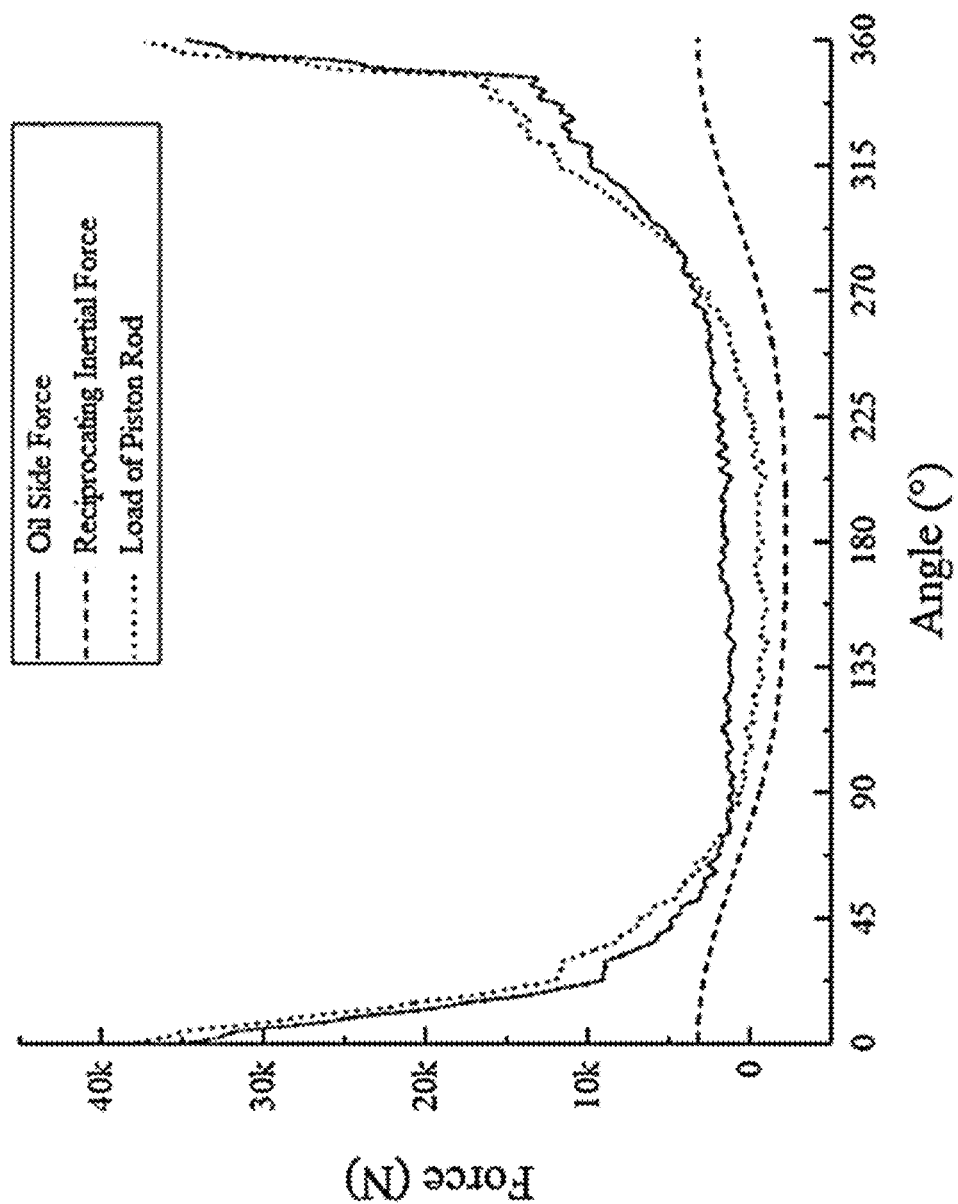
FIG. 10 is a schematic diagram of force curve in one cycle of a method for monitoring oil pressure in an oil cylinder of a diaphragm compressor according to the present disclosure.
Figure 11:
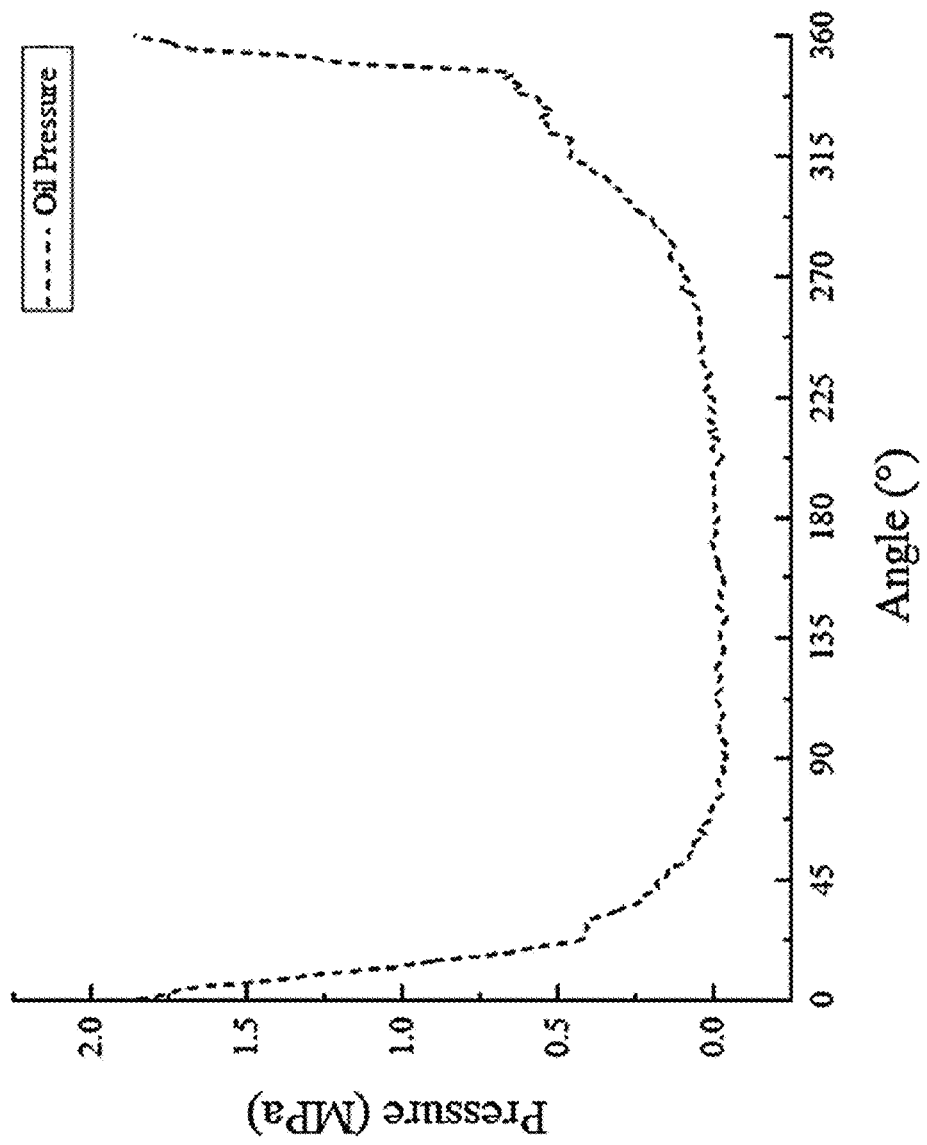
FIG. 11 is an oil pressure curve in one cycle of the method for monitoring oil pressure in the oil cylinder of the diaphragm compressor according to the present disclosure.

Two strain gauges are used, one is the working strain gauge, i.e., the second strain gauge 4, and the other one is a compensation strain gauge, i.e., the third strain gauge 5. The working strain gauge is pasted along the axial direction, and the compensation strain gauge is pasted perpendicular to the axial direction. The working strain gauge and the compensation strain gauge are distinguished by the direction of pasting. A compensation strain gauge is pasted to the same member. However, in a direction no force is exerted (a direction perpendicular to the axial direction), the strain of the strain gauge 1 is ε1, and the strain of the compensation strain gauge is ε2, wherein the ε1 includes a deformation caused by axial tension and compression and deformation caused by temperature, and the ε2 only includes the deformation caused by temperature. Therefore, by subtracting, the deformation caused by temperature is cancelled out. In this way, the temperature effect is eliminated. There are three modes for pasting the strain gauge: one-quarter bridge connection mode, a half-bridge connection mode, and a full-bridge connection mode, all of which are reasonable. In both the one-quarter bridge connection mode and the half-bridge connection mode, only two strain gauges are connected; and in the full-bridge connection mode, four strain gauges are connected. Here, the bridge circuit is constructed by using the half-bridge connection mode, such that the output of the strain gauge is increased and the temperature effect on the lead wire is eliminated. One working strain gauge is pasted along the axial direction in a lateral side of the piston rod, and one compensation strain gauge is pasted close to the working strain gauge and perpendicular to the working strain gauge. In the half-bridge connection mode as shown in FIG. 8, one working strain gauge and one temperature compensation strain gauge are respectively connected to two adjacent bridge arms, namely the first bridge arm 6 and the second bridge arm 7, and the other two bridge arms are connected to a fixed resistor, respectively.

Further, the strain gauge component 2 includes a fourth strain gauge, a fifth strain gauge, a sixth strain gauge, and a seventh strain gauge. The fourth strain gauge is arranged along the axial direction of piston rod 1, the fifth strain gauge and the fourth strain gauge are perpendicular to each other, the fourth strain gauge is connected to a full-bridge circuit, and the fifth strain gauge is also connected to the full-bridge circuit. The sixth strain gauge is arranged along the axial direction of piston rod 1, the seventh strain gauge and the sixth strain gauge are perpendicular to each other, the sixth strain gauge is connected to the full-bridge circuit, and the seventh strain gauge is also connected to the full-bridge circuit.

Here the bridge circuit is constructed by using the full-bridge connection mode. However, as far as the present disclosure is concerned, most preferably the bridge circuit is constructed by using the half-bridge connection mode.

Further, the device for monitoring oil pressure in the oil cylinder of the diaphragm compressor also includes a photoelectric sensor unit and a signal collection unit 8. The photoelectric sensor unit includes a flywheel 9, wherein the flywheel 9 and a photoelectric sensor 10 are arranged correspondingly. The signal collection unit 8 is connected to the strain gauge component 2, the signal collection unit 8 is connected to the photoelectric sensor unit, and the signal collection unit 8 is also connected to a data processing unit 11.

There are many methods for detecting piston dead center signals. Hall type sensors and photoelectric sensors are commonly used in compressor technologies. A transmitting end of a sensor is generally arranged on flywheel 9, and the photoelectric sensor 10 generally is a reflective photoelectric sensor. An installation location of a probe of the photoelectric sensor 10 needs to be accurately positioned. That is, the flywheel 9 is rotated such that the piston is located at an inner dead center and an outer dead center respectively, and then the probe is aligned with a transmitting point (magnetic steel, iron block or reflective stripe).

The flywheel 9 rotates around a central vertical axis until a barring gear reaches the position of a top dead center of the piston, which is used as a benchmark of phase reference. At this moment, a marker is made at any location of the flywheel 9, and a light spot sensor is mounted on a chassis, ensuring that the light spot sensor is aligned with the marker. Under normal circumstances, after the photoelectric sensor 10 collects a stable signal, and when the marker shifts to the photoelectric sensor 10, an impact signal appears and serves as a cycle start location. There is one cycle between every two continuous impact signals.

The photoelectric sensor unit obtains a periodic signal to determine a complete cycle. The photoelectric sensor 10 is mounted at the flywheel 9, and an initial value of a crank angle $\theta$ of the compressor is determined as 0 by an outer dead center signal obtained. An analog signal outputted by the photoelectric sensor 10 is converted by the signal collection unit 8 into a final required digital signal, which is stored for subsequent analysis and processing.

Strain collection cards NI9237 and NI9205 and a collection suitcase cDAQ-9185 from National Instruments (NI) Corporation are used here for signal collection, and data collection is performed by writing a LabVIEW program.

Further, data processing unit 11 is an intelligent terminal.

The intelligent terminal here refers to equipment that can perform calculation and analysis on data, such as computers. In addition to storing data, the computers also run data collection programs to control the sampling and display of signals, for example, setting parameters such as sampling frequency and sample storage length. The computers display the collected dead center signals of the photoelectric sensor 10 and the voltage signals outputted by the strain gauge circuit. The display may be monitored in real-time.

Further, signal collection unit 8 includes a collection card and a signal conditioning module. A data sampling frequency and a corresponding collection channel are set.

The signal collection unit 8 implements a series of functions such as signal filtering, amplification, conditioning and A/D conversion.

The present disclosure also provides a method for monitoring oil pressure in an oil cylinder of a diaphragm compressor. The method includes the following steps.

In Step 1, the signal collection unit synchronously collects a first voltage signal outputted by a photoelectric sensor and a second voltage signal outputted by a strain gauge circuit, converts the collected first voltage signal into a first digital signal for storage, and converts the collected second voltage signal into a second digital signal for storage.

In Step 2, the starting and ending time of one complete cycle is determined according to the first digital signal.

In Step 3, the second digital signal is processed according to the starting and ending time of the complete cycle to obtain an oil pressure value.

The first voltage signal is the output of the photoelectric sensor 10, i.e., the dead center signals.

Further, processing the second digital signal in Step 3 includes:

(1) the calculating strain of a piston rod:

$$\varepsilon(\theta) = \frac{4e(\theta)}{(1+v)EK_s},$$

wherein $\theta$ represents a crank angle, $\varepsilon(\theta)$ represents the strain, $e(\theta)$ represents the second digital signal, $v$ represents a Poisson's ratio, $E$ represents an elastic modulus, and $K_s$ represents a sensitivity coefficient of a strain gauge;

(2) calculating the load of the piston rod: $F_p(\theta)=A_R\varepsilon(\theta)$, wherein $A_R$ represents a cross-sectional area of the piston rod, and $F(\theta)$ represents the load of the piston rod; and (3) calculating an oil pressure: $F_o(\theta)=F_p(\theta)-F_1(\theta)$, $p_o(\theta)=F_o(\theta)/A_P$, wherein $F_o(\theta)$ represents an oil side pressure, $F_1(\theta)$ represents a reciprocating inertial force, the reciprocating inertial force $F_1(\theta)=m_p r\omega^2(\cos\theta+\lambda\cos 2\theta)$, wherein $m_p$ represents a reciprocating inertial mass, $r$ represents a crank radius, $\omega$ represents a rotation speed of the compressor, $\lambda$ represents a crank radius-connecting rod length ratio $\theta$ represents the crank angle, and $p_o(\theta)$ represents an oil pressure, and $A_P$ represents a cross-sectional area of a piston.

During calculation, the computers may be used to perform calculation according to the above formulas, and an implementation method may be software programming or may be Excel.

The calculation is carried out using the formulas based on the data collected. The computers are used here, and the LabVIEW program is written to carry out the calculation.

Further, in Step 1, the first voltage signal is subjected to filtering, amplification, conditioning and A/D conversion, then is converted into a first digital signal, and the first digital signal is transmitted to an intelligent terminal for processing. The second voltage signal is subjected to filtering, amplification, conditioning and A/D conversion, then is converted into a second digital signal, and the second digital signal is transmitted to the intelligent terminal for processing.

In the device for monitoring oil pressure in the oil cylinder of the diaphragm compressor provided by the present disclosure, the strain gauge component 2 is arranged on the surface of piston rod 1, and the strain gauge component 2 is connected to the bridge circuit. In this way, the sensibility of the strain gauge component 2 is improved, and input and output keep a linear relation. The strain gauge component 2 is noninvasively arranged on the piston rod 1 of the diaphragm compressor to measure the load of the piston rod 1, such that the oil pressure can be measured indirectly, and thus the oil pressure of the diaphragm compressor can be measured nondestructively. Nondestructive and noninvasive monitoring of the diaphragm compressor is safe and reliable and can achieve accurate monitoring of the oil pressure, especially in high-pressure working conditions.

"First and second . . . " in the present disclosure are merely for the purpose of distinguishing the corresponding strain gauges, which have the same structures.

Although the present disclosure is described above with reference to specific embodiments, those skilled in the art should understand that within the principle and scope disclosed in the present disclosure, numerous modifications may be made to the configuration and details disclosed in the present disclosure. The protection scope of the present disclosure is determined by the appended claims, and the claims are intended to cover all modifications included in the literal meaning or scope of equivalent technical features in the claims.

What is claimed is:

1. A device for monitoring oil pressure in an oil cylinder of a diaphragm compressor, comprising: a piston rod and a strain gauge circuit, wherein the strain gauge circuit comprises a strain gauge component and a bridge circuit connected, and the strain gauge component is arranged on a surface of the piston rod,
wherein the device further comprises a photoelectric sensor unit and a signal collection unit, wherein the photoelectric sensor unit comprises a flywheel, the flywheel and a photoelectric sensor are arranged correspondingly, the signal collection unit is connected to the strain gauge component, and the signal collection unit is connected to the photoelectric sensor; the signal collection unit is connected to a data processing unit.

2. The device for monitoring oil pressure in the oil cylinder of the diaphragm compressor according to claim 1, wherein the strain gauge component comprises a first strain gauge, and the first strain gauge is connected to the bridge circuit.

3. The device for monitoring oil pressure in the oil cylinder of the diaphragm compressor according to claim 1, wherein the strain gauge component comprises a second strain gauge and a third strain gauge, the second strain gauge is arranged along an axial direction of the piston rod, and the third strain gauge and the second strain gauge are perpendicular to each other; the second strain gauge is connected to a first bridge arm, and the third strain gauge is connected to a second bridge arm.

4. The device for monitoring oil pressure in the oil cylinder of the diaphragm compressor according to claim 1, wherein the strain gauge component comprises a fourth strain gauge, a fifth strain gauge, a sixth strain gauge, and a seventh strain gauge; the fourth strain gauge is arranged along the axial direction of the piston rod, the fifth strain gauge and the fourth strain gauge are perpendicular to each other, the fourth strain gauge is connected to a full-bridge circuit, and the fifth strain gauge is connected to the full-bridge circuit; the sixth strain gauge is arranged along the axial direction of the piston rod, the seventh strain gauge and the sixth strain gauge are perpendicular to each other, the sixth strain gauge is connected to the full-bridge circuit, and the seventh strain gauge is connected to the full-bridge circuit.

5. The device for monitoring oil pressure in the oil cylinder of the diaphragm compressor according to claim 1, wherein the data processing unit is an intelligent terminal.

6. The device for monitoring oil pressure in the oil cylinder of the diaphragm compressor according to claim 1, wherein the signal collection unit comprises a collection card and a signal conditioning module.

7. A method for monitoring oil pressure in an oil cylinder of a diaphragm compressor by a device, wherein the device comprises: a piston rod and a strain gauge circuit, wherein the strain gauge circuit comprises a strain gauge component and a bridge circuit connected, and the strain gauge component is arranged on a surface of the piston rod, wherein comprising:
Step 1: synchronously collecting, by a signal collection unit, a first voltage signal and a second voltage signal outputted by the strain gauge circuit, converting the collected first voltage signal into a first digital signal for storage, and converting the collected second voltage signal into a second digital signal for storage;
Step 2: determining the starting and ending time of one complete cycle according to the first digital signal; and
Step 3: processing the second digital signal according to the starting and ending time of the complete cycle to obtain an oil pressure value,
wherein a photoelectric sensor unit comprises a flywheel, the flywheel and the photoelectric sensor are arranged correspondingly, the signal collection unit is connected to the strain gauge component, and the signal collection unit is connected to the photoelectric sensor; the signal collection unit is connected to a data processing unit.

8. The method for monitoring oil pressure in the oil cylinder of the diaphragm compressor according to claim 7, wherein the processing the second digital signal in Step 3 comprises:
(1) the calculating strain of the piston rod:

$$\varepsilon(\theta) = \frac{4e(\theta)}{(1+v)EK_s},$$

wherein $\theta$ represents a crank angle, $\varepsilon(\theta)$ represents the strain, $e(\theta)$ represents the second digital signal, $v$ represents a Poisson's ratio, $E$ represents an elastic modulus, and $K_s$ represents a sensitivity coefficient of a strain gauge;
(2) calculating the load of the piston rod: $F_p(\theta)=A_R\varepsilon(\theta)$, wherein $A_R$ represents a cross-sectional area of the piston rod, and $F(\theta)$ represents the load of the piston rod; and
(3) calculating an oil pressure: $F_o(\theta)=F_p(\theta)-F_1(\theta)$, $p_o(\theta)=F_o(\theta)/A_p$,
wherein $F_o(\theta)$ represents an oil side pressure, $F_1(\theta)$ represents a reciprocating inertial force, the reciprocating inertial force $F_1(\theta)=m_p r\omega^2(\cos\theta+\lambda\cos 2\theta)$, wherein $m_p$ represents a reciprocating inertial mass, r represents a crank radius, $\omega$ represents a rotation speed of the compressor, $\lambda$ represents a crank radius-connecting rod length ratio $\theta$ represents the crank angle and $p_o(\theta)$ represents an oil pressure, and $A_p$ represents a cross-sectional area of a piston.

9. The method for monitoring oil pressure in the oil cylinder of the diaphragm compressor according to claim 8, wherein in Step 1, the first voltage signal is subjected to filtering, amplification, conditioning and analog/digital (A/D) conversion, then is converted into a first digital signal, and the first digital signal is transmitted to an intelligent terminal for processing, the second voltage signal is subjected to filtering, amplification, conditioning and A/D conversion, then is converted into a second digital signal, and the second digital signal is transmitted to the intelligent terminal for processing.

10. The device for monitoring oil pressure in the oil cylinder of the diaphragm compressor according claim 2, wherein further comprising a photoelectric sensor unit and a signal collection unit, wherein the photoelectric sensor unit comprises a flywheel, the flywheel and a photoelectric sensor are arranged correspondingly, the signal collection unit is connected to the strain gauge component, and the signal collection unit is connected to the photoelectric sensor; the signal collection unit is connected to a data processing unit.

11. The device for monitoring oil pressure in the oil cylinder of the diaphragm compressor according to claim 10, wherein the data processing unit is an intelligent terminal.

12. The device for monitoring oil pressure in the oil cylinder of the diaphragm compressor according to claim 10, wherein the signal collection unit comprises a collection card and a signal conditioning module.

13. The device for monitoring oil pressure in the oil cylinder of the diaphragm compressor according claim 3, wherein further comprising a photoelectric sensor unit and a signal collection unit, wherein the photoelectric sensor unit comprises a flywheel, the flywheel and a photoelectric sensor are arranged correspondingly, the signal collection unit is connected to the strain gauge component, and the signal collection unit is connected to the photoelectric sensor; the signal collection unit is connected to a data processing unit.

14. The device for monitoring oil pressure in the oil cylinder of the diaphragm compressor according to claim 13, wherein the data processing unit is an intelligent terminal.

15. The device for monitoring oil pressure in the oil cylinder of the diaphragm compressor according to claim 13, wherein the signal collection unit comprises a collection card and a signal conditioning module.

16. The device for monitoring oil pressure in the oil cylinder of the diaphragm compressor according claim 3, wherein further comprising a photoelectric sensor unit and a signal collection unit, wherein the photoelectric sensor unit comprises a flywheel, the flywheel and a photoelectric sensor are arranged correspondingly, the signal collection unit is connected to the strain gauge component, and the signal collection unit is connected to the photoelectric sensor; the signal collection unit is connected to a data processing unit.

17. The device for monitoring oil pressure in the oil cylinder of the diaphragm compressor according to claim 16, wherein the data processing unit is an intelligent terminal.

18. The device for monitoring oil pressure in the oil cylinder of the diaphragm compressor according to claim 16, wherein the signal collection unit comprises a collection card and a signal conditioning module.

19. The device for monitoring oil pressure in the oil cylinder of the diaphragm compressor according claim 4, wherein further comprising a photoelectric sensor unit and a signal collection unit, wherein the photoelectric sensor unit comprises a flywheel, the flywheel and a photoelectric sensor are arranged correspondingly, the signal collection unit is connected to the strain gauge component, and the signal collection unit is connected to the photoelectric sensor; the signal collection unit is connected to a data processing unit.

* * * * *